(12) United States Patent
Seto et al.

(10) Patent No.: US 7,406,662 B2
(45) Date of Patent: Jul. 29, 2008

(54) DATA INPUT PANEL CHARACTER CONVERSION

(75) Inventors: Tetsuo Seto, Bellevue, WA (US); Shawna J Davis, Seattle, WA (US); Takanobu Murayama, Seattle, WA (US); Jeffrey W Pettiross, Seattle, WA (US); Adrian J Garside, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 3 days.

(21) Appl. No.: 10/705,718

(22) Filed: Nov. 10, 2003

(65) Prior Publication Data

US 2005/0099408 A1     May 12, 2005

(51) Int. Cl.
*G06F 15/00* (2006.01)
*G06F 13/00* (2006.01)

(52) U.S. Cl. ...................... 715/763; 345/161

(58) Field of Classification Search ......... 715/762–765, 715/703, 799, 538, 817–815, 827; 345/467, 345/698, 161
See application file for complete search history.

(56) References Cited

U.S. PATENT DOCUMENTS

| 4,980,840 A | * | 12/1990 | Yin et al. ................... 715/538 |
| 5,526,259 A | * | 6/1996 | Kaji ............................ 704/3 |
| 6,311,323 B1 | * | 10/2001 | Shulman et al. ............ 717/111 |
| 6,694,055 B2 | * | 2/2004 | Wu ............................ 382/185 |
| 6,766,320 B1 | * | 7/2004 | Wang et al. .................. 707/5 |
| 2003/0197736 A1 | * | 10/2003 | Murphy ...................... 345/780 |

* cited by examiner

*Primary Examiner*—Cao Nguyen
(74) *Attorney, Agent, or Firm*—Birch, Stewart, Kolasch & Birch, LLP

(57) ABSTRACT

An in-place data input panel provides a user with access to a list of alternate characters to which displayed characters may be converted. The data input panel provides an indicator, such as an indicator bar, corresponding to segmentation of the characters. A user can change the segmentation of the characters by expanding or contracting the segmentation bar. Also, the user can access a drop-down menu listing alternate character choices corresponding to the characters in the segment indicated by the segmentation bar.

18 Claims, 10 Drawing Sheets

DATA INPUT PANEL CHARACTER CONVERSION

FIELD OF THE INVENTION

The present invention relates to a tool for associating multiple characters. Various aspects of the present invention are particularly applicable to associating characters for conversion from one character set, such as Katakana, to another character set, such as Kanji.

BACKGROUND OF THE INVENTION

Computers are now everyday tools, and are regularly being used in all walks of life and all around the world. As computers have become more and more commonplace, computer designers have sought to make computers still more accessible and user-friendly. One such effort to make computers still easier to use has been the development of natural input methods. These methods, which allow speech and handwriting input, permit a user to enter data into a computer simply by speaking the data out loud or writing the data on a digitizer with a stylus to create electronic ink. With speech input, the phonemes of the input are analyzed to convert the speech input to typewritten text. Similarly, if the input is electronic ink, the shapes of the ink are analyzed to convert the handwriting into typewritten text.

The advent of natural input methods has been particularly beneficial to computer users who desire to create data in an Asian language. Latin languages are typically written with a phonetic character set or alphabet, where each character represents a sound. Latin languages thus employ a relatively small number of characters (including punctuation). Accordingly, most, if not all, of the characters used to write in a Latin language can be provided on a keyboard. Many Asian languages, however, may be written with a pictographic character set having thousands of characters. Needless to say, a keyboard cannot contain enough keys to represent such a large number of characters.

To address this problem, computer developers have created specialized programs for converting alphabetic characters into pictographic characters. For example, a computer user in Japan may type a desired word of data using characters from a phonetic alphabet, such as Hiragana or Katakana (collectively referred to herein as "Kana" characters). The user may then activate a Kana-to-Kanji conversion software application, which provides the user with a selection of possible alternates for the word from the Kanji character set. The user can then select the appropriate Kanji character (or characters), which are stored as the input data.

As previously noted, the development of natural input methods has greatly assisted Asian language computer users. Rather than always having to convert phonetic Kana characters to pictographic Kanji characters, the user may instead enter the desired data as speech input, or employ a stylus to write pictographic Kanji characters directly in electronic ink. For example, Asian language versions of the Microsoft Windows XP Tablet PC operating system provide a special user interface for receiving data from natural input methods. This type of user interface, sometimes referred to as a "TIP" (for text input panel or tablet input panel), includes a handwriting input area corresponding to an area of a digitizer onto which a user can write with a stylus to create electronic ink. This electronic ink is then converted to typewritten characters or "recognized."

After the electronic ink has been recognized, the recognized characters are inserted into the target user interface of a software application (such as a word-processing application like Microsoft Word) at an insertion point. With some configurations, the text input panel may also display the recognized characters before inserting them at the insertion point. This allows a user to correct any misrecognition of the character before it is inserted. Other configurations, however, may insert the recognized characters directly into the target user interface.

While this type of natural input method tool is more convenient for Asian language users, there will still be some circumstances in which a user will desire to convert one or more phonetic characters into a phrase containing a pictographic character. For example, some Kanji characters are extremely complex, and require a writer to write a significant number of strokes. Thus, while a user may recognize a Kanji character, the user may not remember how to accurately write the Kanji character. Also, even if the user does know how to write the desired Kanji character, it may be faster to write simpler Kana characters and then convert them into the desired Kanji character.

Accordingly, it is still desirable to provide Asian language users employing natural input methods with the ability to convert phonetic characters into pictographic characters.

With conventional character conversion tools, the functionality of the tool is accessed from within the target user interface after the user has inserted the phonetic characters (either from a keyboard or from recognized electronic ink). When a user selects phonetic characters to convert into a phrase containing a pictographic character, the tool provides a list of possible choices (referred to herein as "alternates" or "alternate choices"). This list of alternate choices is displayed in or near the target user interface. Similarly, if the user wishes to change the segmentation of the selected phonetic text, the controls for changing the segmentation will typically be displayed in or near the target user interface. When the user is employing a separate text input interface, however, this arrangement is inconvenient and distracting. With the conventional arrangement, the user must continuously switch his or her attention from the separate text input interface to the target user interface.

Accordingly, rather than accessing the functionality of a conversion tool through the target user interface, it would be more desirable to access the functionality of the tool through the separate text input interface. For example, if the user is employing a text input panel as described above, it would be desirable to allow the user to access the functionality of a character conversion tool through the text input panel rather than through the target user interface (or through another specialized user interface). This arrangement would allow a user to input handwriting data, view the characters recognized from the handwriting data, select one or more of the recognized characters for conversion to a phrase containing a pictographic character, and then select the desired phrase before any characters are inserted into the target user interface. Moreover, the user would not need to divert his or her attention from the data input panel at any time during the process.

BRIEF SUMMARY OF THE INVENTION

Advantageously, various examples of the invention provide a data input panel, such as a text input panel, that provides a user with access to all of the functionality of a phonetic-to-pictographic conversion tool. More particularly, various examples of the invention provide a technique by which a user can select phonetic characters displayed in the data input panel for conversion to a phrase containing one or more pictographic characters. Further, various examples of the invention allow a user to access a list of alternate choices for phonetic-to-pictographic conversion from the data input panel.

Various examples of the invention provide a data input panel, such as a text input panel, that displays phonetic characters for conversion to pictographic characters. Additionally, the data input panel displays an indicator associating multiple phonetic characters into a single segment. As used herein, the term "segment" refers to a group of characters that are to be converted or translated as a single unit into an alternate group of characters. Further, the user may modify this indicator to change the characters associated together into a segment. For example, the indicator may be a bar indicator extending below phonetic characters grouped together into a segment. The user can then extend, contract, or even move the bar indicator to change the phonetic characters associated with the segment.

With various examples of the invention, the data input panel may also provide a user with access to a list of alternate pictographic characters to which selected phonetic characters may be converted. For example, with some implementations of the invention, a user may activate the indicator bar to access a drop-down menu listing alternate pictographic character conversion choices corresponding to the selected phonetic characters. These and other features and advantages of different implementations of the invention will be described in more detail below.

DETAILED DESCRIPTION OF THE INVENTION

Operating Environment

Figure 1:
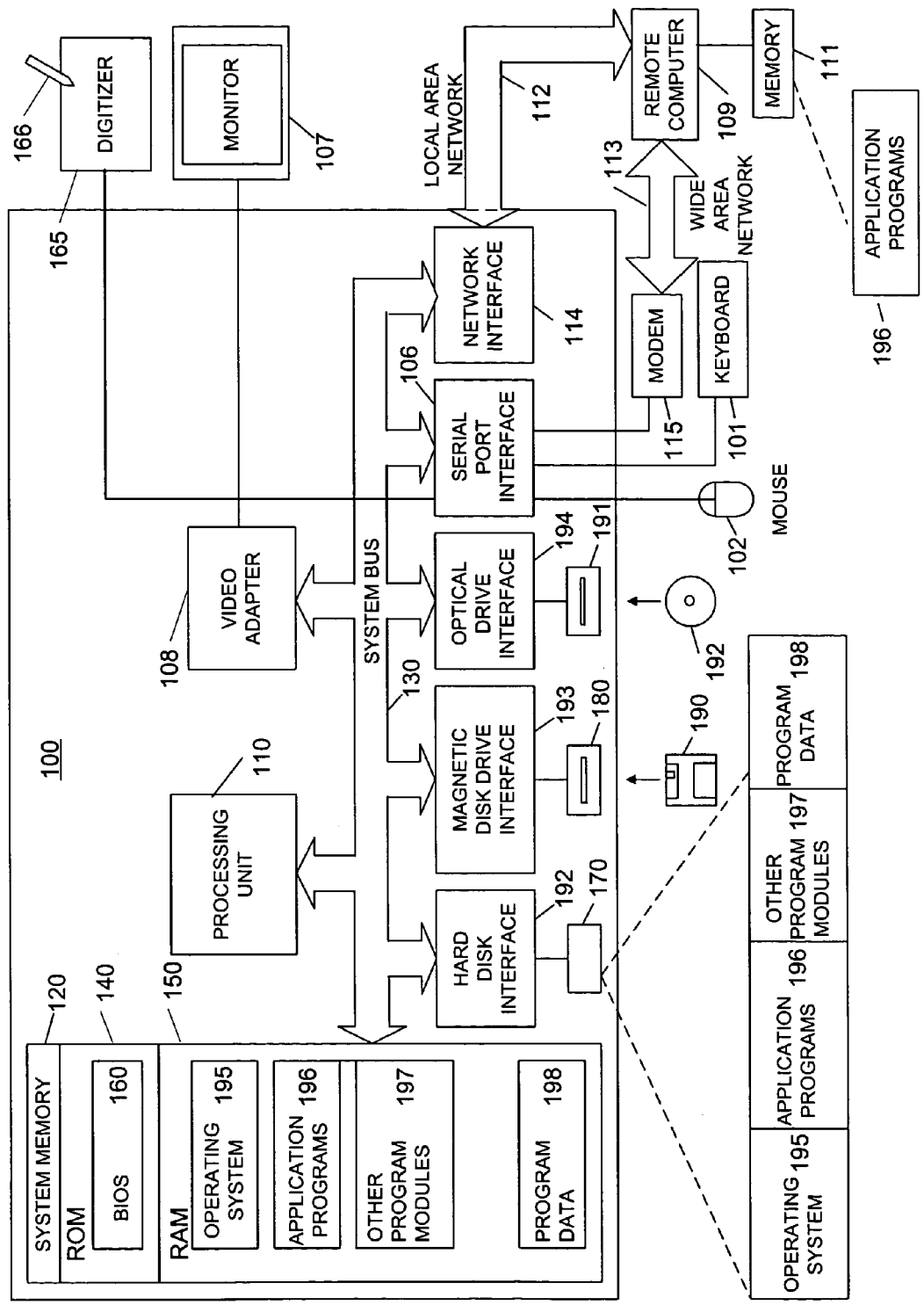
FIGS. 1 and 2 show examples of an operating environment that can be used to implement a data input panel having character conversion functionality according to various implementations of the invention.

FIG. 1 illustrates a schematic diagram of a general-purpose digital computing environment that can be used to implement various aspects of the present invention. In particular, FIG. 1 shows a computer 100 of the type that may be employed to implement various examples of the invention. The computing device 100 typically includes at least some form of computer readable media. Computer readable media can be any available media that can be accessed by the computing device 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the operating environment 100.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As shown in FIG. 1, the computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system (BIOS) 160 contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM, DVD ROM, or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown separate from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example of an operating environment for various embodiments of the invention, it should be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
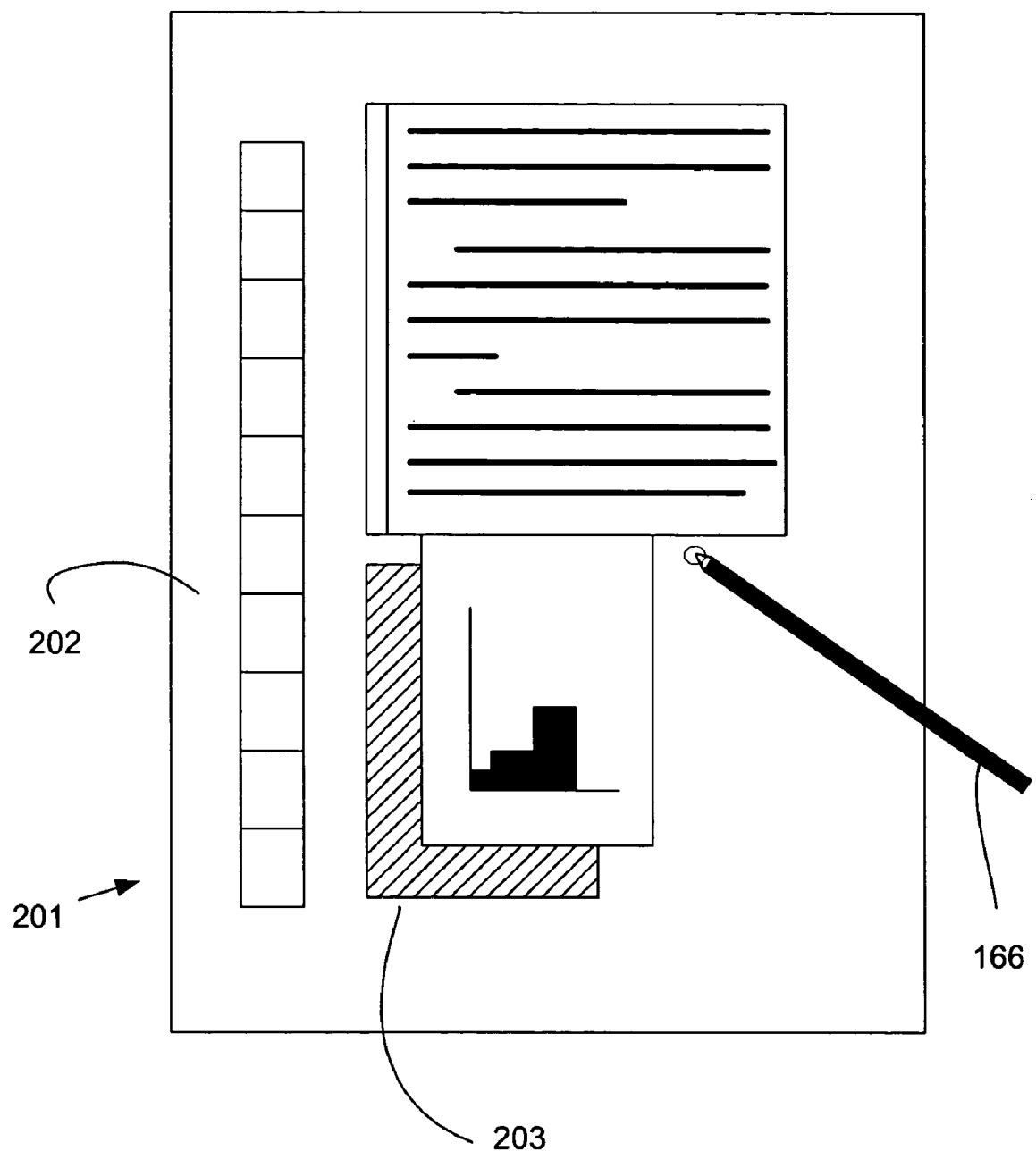

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of graphical user interfaces 203, such as windowed graphical user interfaces, is displayed. Using stylus 166, a user can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, and touch-sensitive digitizers may also be used. The pen-based computing system 201 interprets gestures made using stylus 166 in order to manipulate data, enter text, and execute conventional computer application tasks, such as creating, editing, and modifying spreadsheets, word processing programs, and the like.

The stylus 166 may be equipped with buttons or other features to augment its capabilities. In one example, a stylus 166 could be implemented as a "pencil" or "pen", in which one end constitutes a writing portion. The other end of the stylus 166 then constitutes an "eraser" end, which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image if the display is a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may support a mark-up language including a language like the extensible markup language (XML). Further, the system may use DCOM as another implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

Tool For Character Conversion

Figure 3:
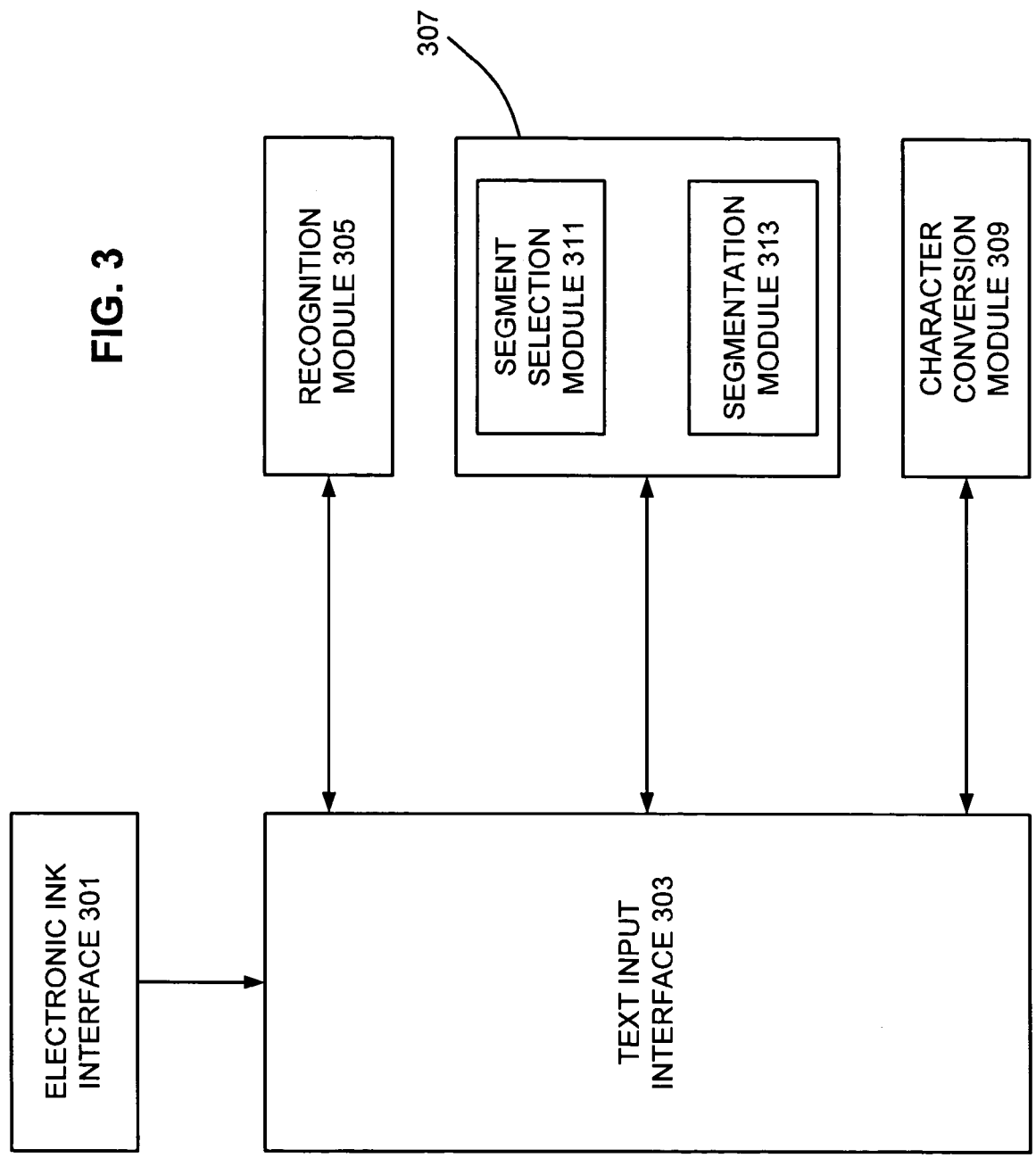
FIG. 3 illustrates one example of a computing system incorporating a character conversion tool according to various implementations of the invention.

FIG. 3 illustrates a computing system incorporating one example of a tool for character conversion that may be provided according to various embodiments of the invention. This system may be implemented using, for example, the computer 100 illustrated in FIGS. 1 and 2. As seen in this figure, an electronic ink interface 301 captures electronic ink input. This type of interface is well-known in the art, and thus will not be discussed in further detail here.

The captured electronic ink is provided to a text input interface 303. With various examples of the invention, the text input interface 303 may be a data input panel, such as a text input panel of the type provided by the Microsoft Windows XP Tablet PC operating system. The text input interface 303 may display the captured electronic ink as the user is creating the electronic ink by "writing" on a digitizer 165 with a stylus 166. With the illustrated embodiment, the text input interface 303 also provides the captured electronic ink to the recognition module 305. The recognition module 305 then recognizes typewritten characters corresponding to the electronic ink. It should be appreciated, however, that with alternate embodiments of the invention, the electronic ink interface 301 may provide the captured electronic ink directly to the recognition module 305 for character recognition.

With some embodiments of the invention, the recognized text is returned to the text input interface 303 for insertion within a target software application user interface. With some embodiments of the invention, the text input interface 303 may display the recognized text before insertion, however, to allow a user to correct misrecognized text. Alternately, the text input interface 303 or recognition module 305 may forward the recognized text directly to the target user interface for insertion.

In the illustrated embodiment, the text input interface 303 also provides the recognized text to the segmentation tool 307 implementing an example of the invention. As will be discussed in more detail below, the segmentation tool 307 includes a segmentation selection module 311 and a segmentation module 313. The segmentation selection module 311 provides functionality that allows a user to select one or more of the recognized characters for inclusion in a segment. The segmentation module 313 then creates a segment associating the selected characters. With some embodiments of the invention, the segmentation module 313 also may create a default segment associating recognized characters, which a user may then modify with the segment selection module 311. According to various embodiments of the invention, the functionality provided by the segmentation selection module 311 and/or the segmentation module 313 may be hosted by the text input interface 303. With still other embodiments of the invention, however, the segment selection module 311, the segmentation module 313, or both may be incorporated into the text input interface 303.

The characters associated together into a segment by the segmentation module 313 are provided to the character conversion module 309. In response, the character conversion module 309 generates one or more alternate groups of characters corresponding to the recognized characters. The results of the conversion process are then provided back to the text input interface 303, so that the user may select the desired conversion from among the alternate choice results. The character conversion module 309 may, for example, convert phonetic characters into a phrase containing one or more pictographic characters. Various examples of such character conversion modules are well-known in the art, and thus will not be described in detail here. Also, it should be noted that the character conversion module 309 may alternately be incorporated into the text input interface 303 or the segmentation tool 307.

Text Input Panel

Figure 4:
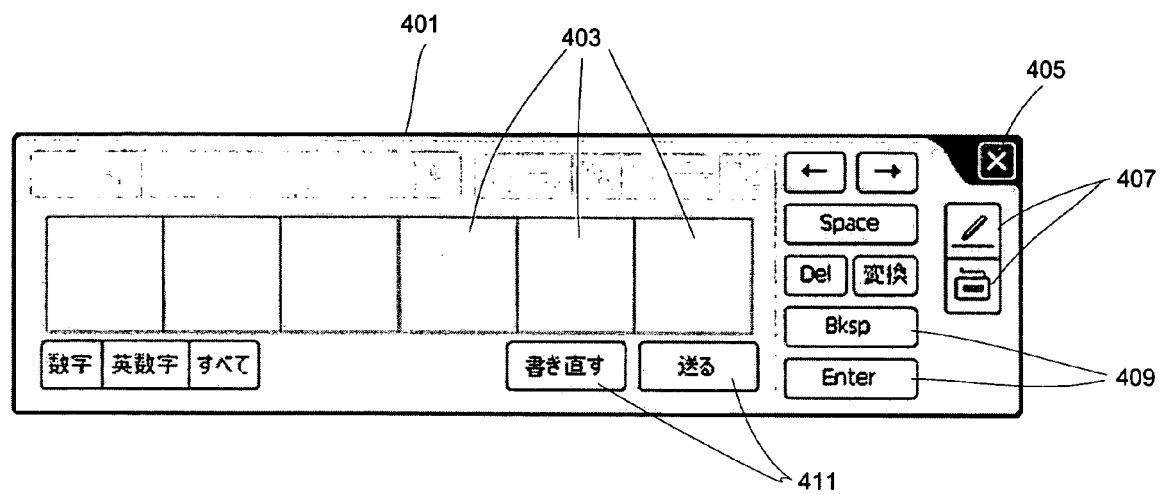
FIG. 4 shows illustrates a data input panel for inputting Asian language characters according to various implementations of the invention.

FIG. 4 illustrates one example of a text input interface 303 according to various examples of the invention. More particularly, this figure illustrates a data input panel 401 for use by Asian language users. This data input panel 401 simultaneously displays multiple writing areas 403, so that a user can write a single Asian-language character in each area 403. The data input panel 401 may also include one or more controls, such as button controls, for providing additional functionality. For example, the data input panel 401 may include a control button 405 to close the data input panel 401, and control buttons 407 for changing the appearance of the data input panel 401, control buttons 409 for editing recognized text displayed in the input data panel 401, It should be noted that the data input panel 401 may provide different writing surfaces, such as a writing surface for Latin language writing and even a soft keyboard. Accordingly, the data input panel 401 may also provide control buttons 411 for changing the writing surface provided by the data input panel 401.

Figure 5:
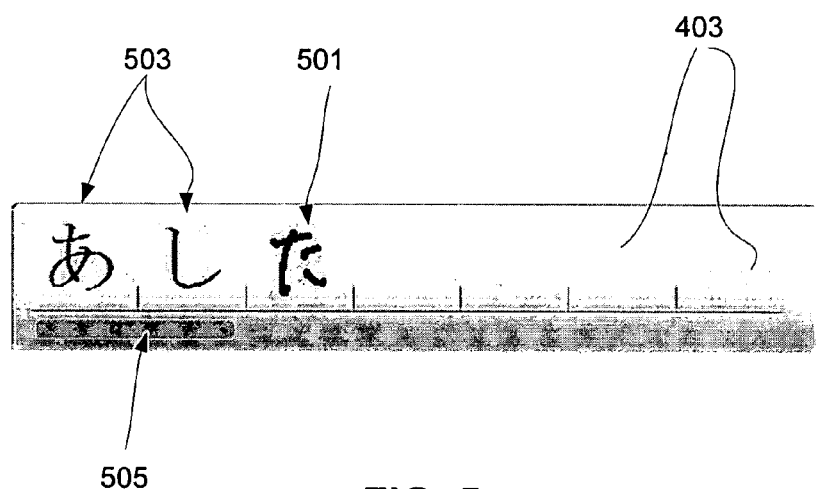
FIGS. 5-16 show various examples of data input panels that may be provided to select and convert characters according to various implementations of the invention.

FIG. 5 illustrates the use of a data input panel like that shown in FIG. 4. The data input panel includes a series of writing areas 403, into which a user can write characters, such as phonetic characters. In this figure, the third writing area 403 from the left displays a character 501 handwritten in electronic ink. More particularly, a user has written the Japanese Hiragana character "ta" in the third writing area 403. The first and second writing areas 403 from the left then display typewritten Hiragana characters 503 that already have been recognized from handwritten electronic ink. In particular, these writing areas 403 display the Hiragana characters "a" and "shi," respectively.

The data input panel also displays a segmentation bar 505. As will be discussed in more detail below, the segmentation bar 505 is located directly beneath characters that are associated together into a segment. Thus, in this figure, the recognized characters 503 are associated together into a single segment. This segment does not include the unrecognized character 501.

Associating characters into a segment can significantly assist in the conversion or translation of characters. For example, the English letters "t-o-g-e-t-h-e-r" can be segmented two different ways. In one configuration, all of the letters can be included in a single segment (thus creating the word "together"). In another configuration, the letters can be associated into three different segments (thus creating the phrase "to" "get" "her"). Accordingly, different combinations of phonetic and pictographic characters (such as Kana or Kanji characters) corresponding to the word "together" will be generated as conversion alternates than would be generated for the phrase "to get her."

Similarly, in Japanese, the phonetic characters for the sounds "kyo" "u" "ha" "i" and "sha" can be segmented in one configuration to form the words "Kyou ha Isha" (Today is Doctor). These characters also can be segmented in another configuration to form the words "Kyou Haisha" (Today Dentist). Thus, conversion of a segment made up of the Hiragana characters for the sounds "i" and "sha" will generate Kanji conversion alternates including the Kanji character for a doctor. On the other hand, conversion of a segment made up of the Hiragana characters for the sounds "ha" "i" and "sha" will generate Kanji conversion alternates including the Kanji character for a dentist.

Figure 6:
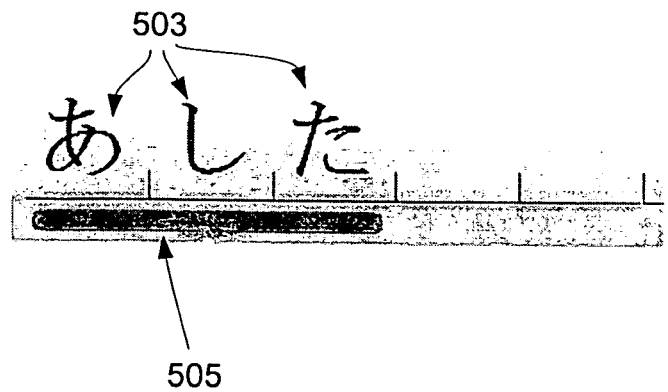

Once the character 501 shown in FIG. 5 has been recognized, its corresponding typewritten character 503 is displayed in its place as illustrated in FIG. 6. As also shown in FIG. 6, the segmentation bar 505 is automatically extended to include the newly recognized character in the existing segment. With various examples of the invention, the segment may automatically be expanded to include all newly recognized text. Alternately, segmentation may be automatically selected based upon known segmentation criteria. This type of automatic segmentation is employed by conventional character conversion software applications, and thus will not be discussed in detail here.

Figure 7:
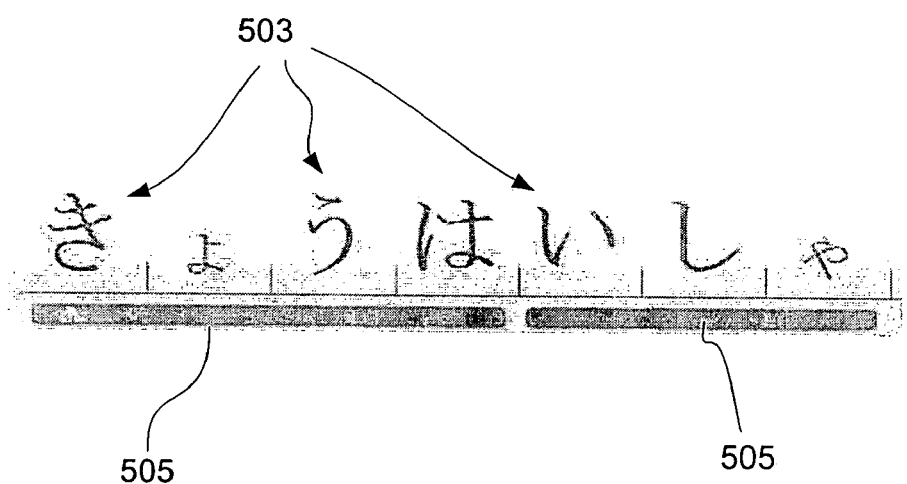

FIG. 7 illustrates another example of a data input panel according to various embodiments of the invention. In this figure, the first two writing areas 403 from the left display recognized characters 503 in Hiragana for the sound "kyo." The third writing area 403 then displays the recognized character 503 in Hiragana for the sound "u," while the fourth writing area 403 displays the recognized character 503 in Hiragana for the sound "ha." The fifth writing area 403 displays the recognized character 503 in Hiragana for the sound "i," while the sixth and seventh writing areas 403 display the recognized characters 503 in Hiragana for the sound "sha." A first segmentation bar 505 extends beneath the characters 503 for "kyo," "u" and "ha," indicating that these characters 503 are associated together into a single segment. A second segmentation bar 505 then extends beneath the characters 503 for the sounds "i" and "sha," indicating that these characters 503 are associated together into a different segment.

Figure 8:
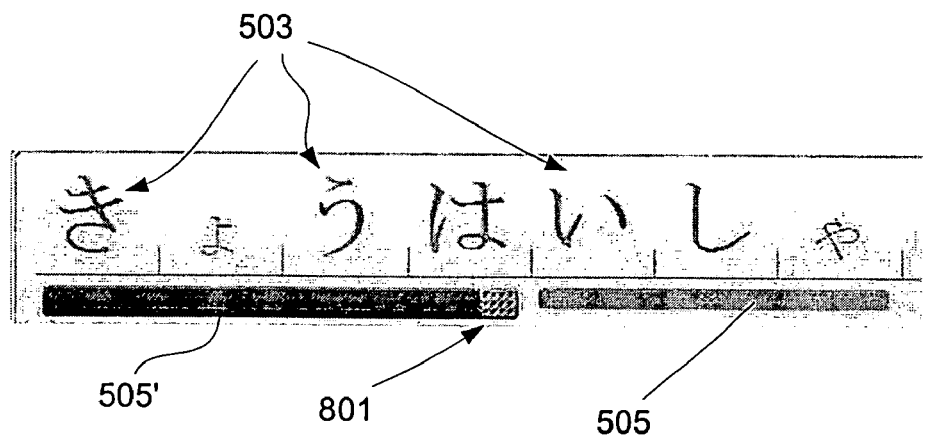

In the illustrated embodiment, the segmentation bar 505 can be used both to change the segmentation of the displayed characters 503 and to select a conversion alternate for the characters 503 included in the corresponding segment. With some implementations of the invention, a user may perform either function by first selecting the segmentation bar 505. For example, the segmentation bar 505 may be selected when a user employs a pointing device, such as a stylus, mouse, rollerball, joystick, touchpad or the like, to move a pointer over the segmentation bar 505. FIG. 8 illustrates one implementation of the invention where the segmentation bar 505 changes appearance (shown as the segmentation bar 505') to indicate that it has been selected. As seen in this figure, the selected segmentation bar 505' appears darker and thicker than the unselected segmentation bar 505. It should be appreciated, however, that other techniques may alternately or additionally be employed to indicate when the user has selected the segmentation bar 505. In addition, the selected segmentation bar 505' includes a segmentation grip 801, which is distinguishable from the other portions of the selected segmentation bar 505'.

Figure 9:
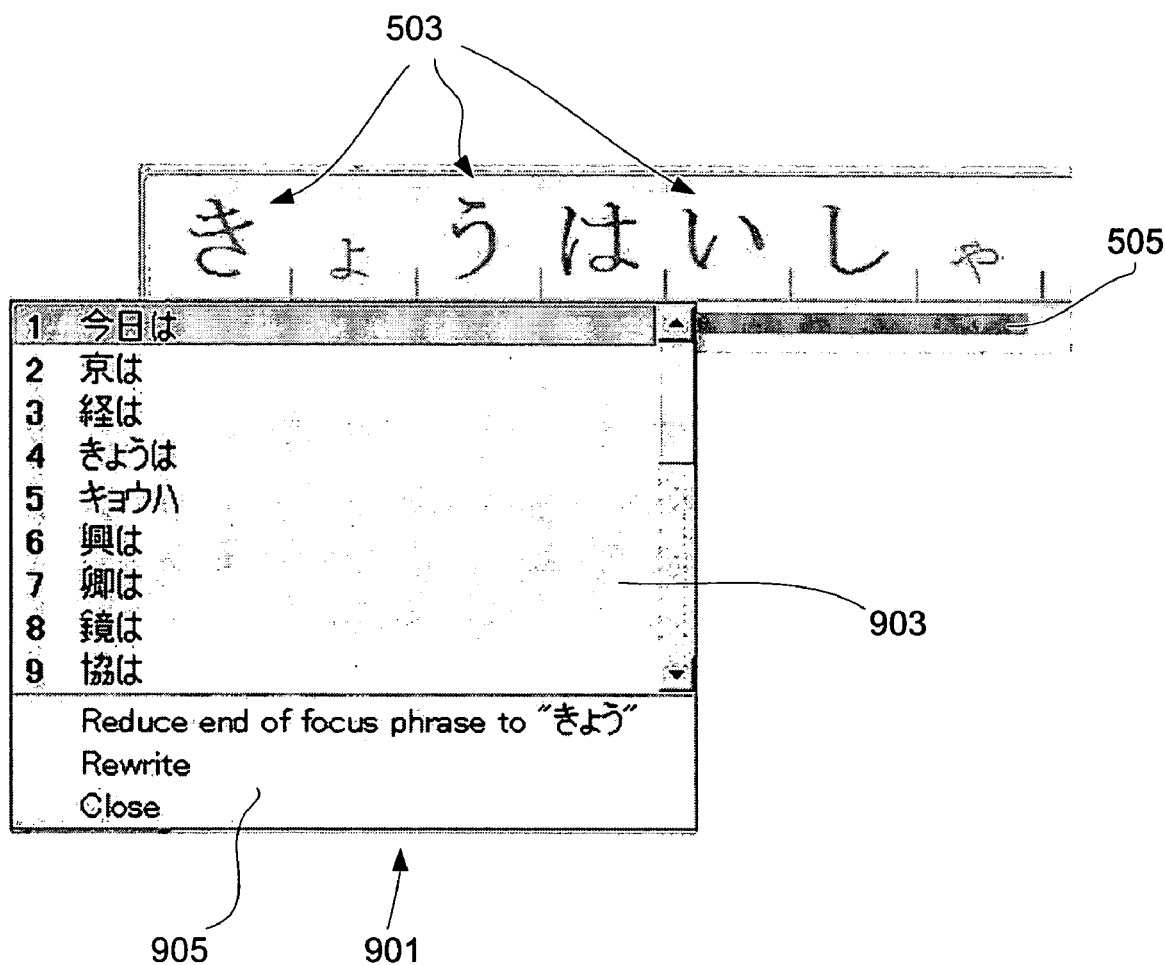

To display a list of conversion alternates for the segmented characters 503, a user activates the selected segmentation bar 505'. With some embodiments, for example, a user can activate the selected segmentation bar 505' by actuating a control button associated with a pointing device (referred to as "clicking" on the selected segmentation bar 505'). In response, the data input panel displays one or more alternate choices for converting the characters 503 in the corresponding segment. For example, the data input panel may display a conversion alternates interface 901, as shown in FIG. 9. The conversion alternates interface 901 includes a list 903 of alternate choices of characters corresponding to the characters 503 in the segment.

In the illustrated embodiment, the list 903 of conversion alternates includes both phrases with only Kanji characters and phrases with combinations of both Kanji and Kana characters. It thus should be appreciated that invention is not limited to converting characters of one type entirely to characters of a different type. Rather, various implementations of the invention may convert characters to a variety of alternate character combinations, including combinations that contain one or more characters of the original type. Also, at least one of the alternate choices in the list 903 includes the phrase "today is," corresponding to the characters 503 included in the segment. The conversion alternates interface 901 may also include a list 905 of commands, such as "rewrite" and "close." A user can thus select the desired conversion alternate from the list 903, or execute a command provided on the list 905.

If a user instead wishes to change the segmentation of the displayed characters, the user can perform this task through the segmentation bar 505 as well. For example, in the illustrated embodiment, the user can modify the length of the selected segmentation bar 505' with the segmentation grip 801. Specifically, the user may employ a pointing device to move a pointer over the segmentation grip 801. When the pointer is positioned over the segmentation grip 801, the user can then actuate a control button associated with the pointer. (For example, the user may "click-and-hold" on the segmentation grip 801.) The user can then move the pointing device left or right to contract or expand the segmentation bar 505, and thereby change the characters 503 included in the corresponding segment.

Alternately or additionally, a user may modify a segment by executing a command in the list 903 of commands. For example, as shown in FIG. 9, the list 903 may include a command to reduce the size of the segment by one character. Thus, if the user selects this command, the Hiragana character 503 for the sound "ha" will be removed from the segment identified by the first segmentation bar 505, and will instead be included in the segment identified by the second segmentation bar 505.

Figure 10:
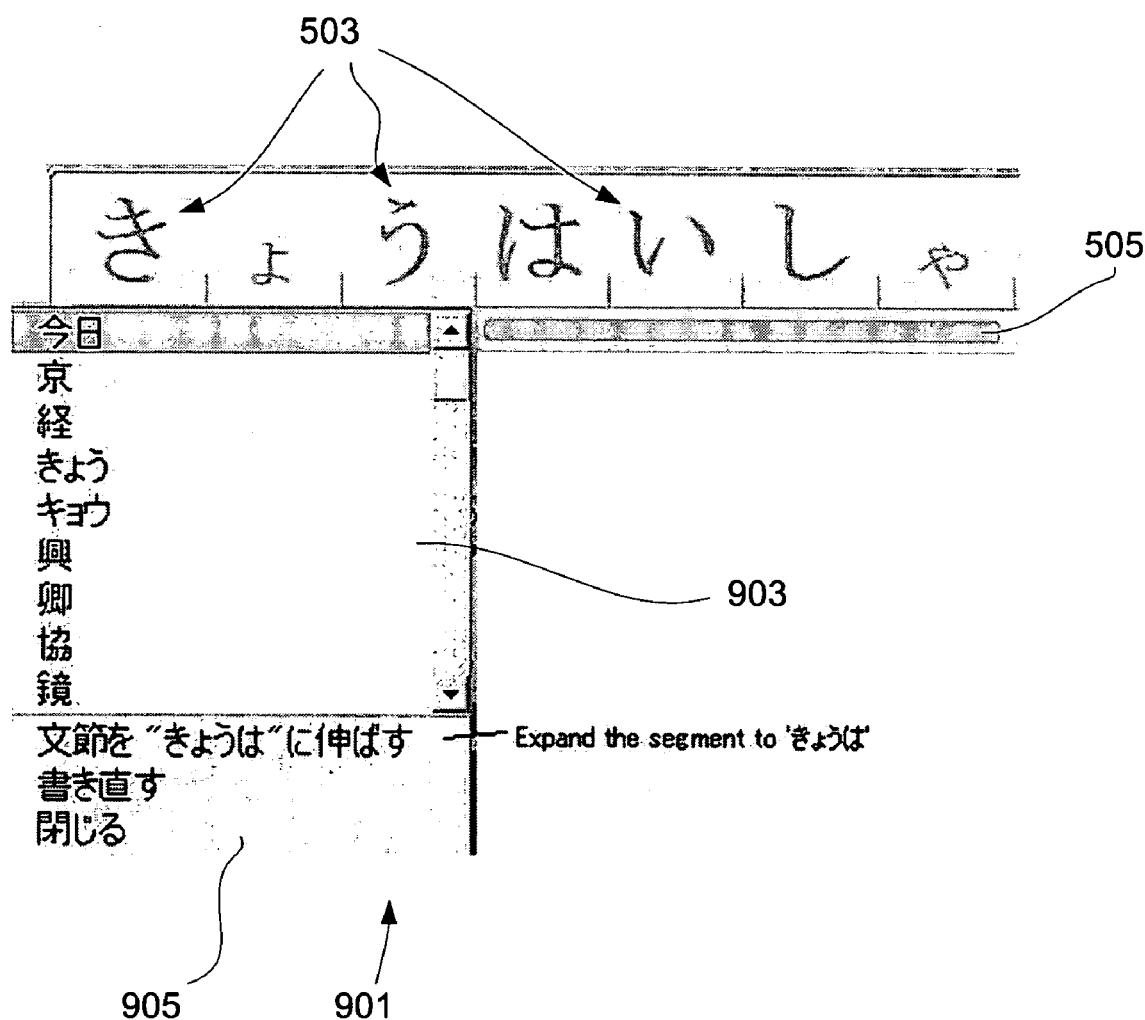

The results of such a segmentation change are shown in FIG. 10. As seen in this figure, the Hiragana character 503 for the sound "ha" has been removed from the segment identified by the first segmentation bar 505, and is instead included in the segment identified by the second segmentation bar 505. The first segmentation bar 505 has contracted in response (or has been manually contracted by the user), so that it does not extend under the Hiragana character 503 for the sound "ha." Likewise, the second segmentation bar has expanded in response (or has been manually expanded by the user) to extend under this character 503. Thus, when the user activates the first segmentation bar 505, the conversion alternates interface 901 for the first segment is different, as illustrated in FIG. 10.

More particularly, the list 903 of the conversion alternates shown in this figure provides different combinations of characters (including phrases with both Kanji and Kana characters). Also, the list 903 includes an alternate choice corresponding to the phrase "today." As shown in this figure, modifying the segment may also change the commands available for selection in the list 905 of commands. For example, with the illustrated embodiment, the list 905 includes a command to modify the segment to again include the Hiragana character 503 for the sound "ha."

It should be noted that, while the examples of the command list 905 illustrated in FIGS. 9 and 10 contain only a single command to change the segment, different embodiments of the invention may provide any desired combination of commands to change a segment. For example, the list 905 may include both a command to expand a segment by another character and a command to reduce the segment by another character. Further, the list 905 may include commands to expand the segment to a preceding character, expand the segment to a subsequent character, reduce the segment by a first character, reduce the segment by a last character, expand the segment by multiple characters, reduce the segment by multiple characters, or any combination thereof.

Figure 11:
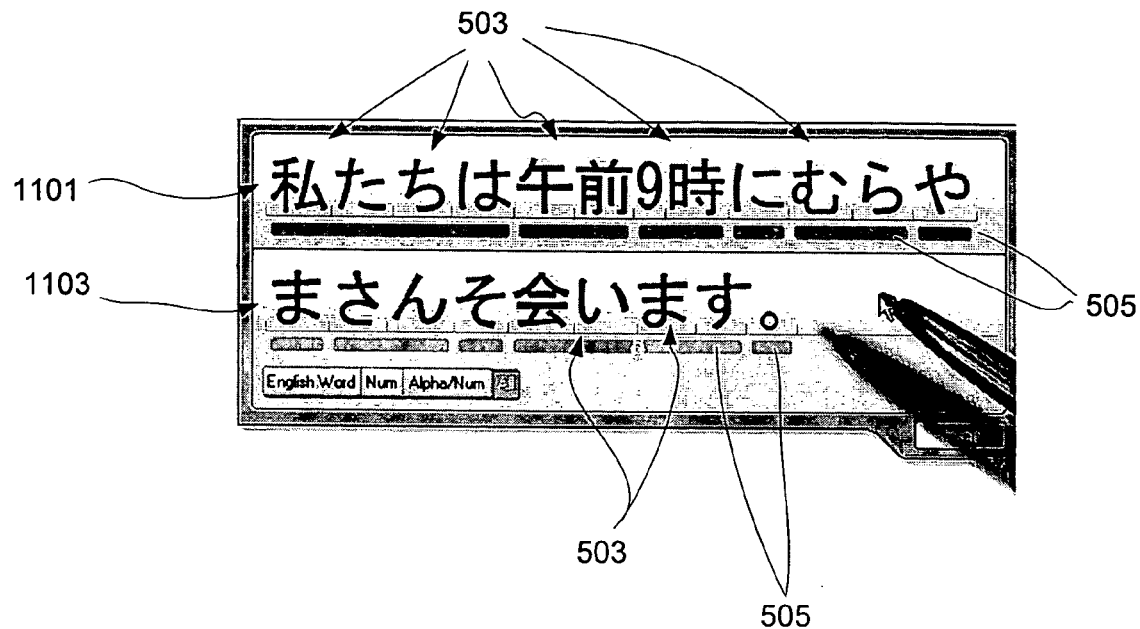

While the examples of the invention illustrated in FIG. 5-10 relate to segmentation in a single line of text, various embodiments of the invention may also allow a user to extend a segment to include characters in multiple lines of text. FIG. 11 illustrates a data input panel displaying a first line 1101 of characters 503 and a second line 1103 of characters 503. As shown in this figure, the characters 503 in both lines of text are associated into different segments, as indicated by the segmentation bars 505.

Figure 12:
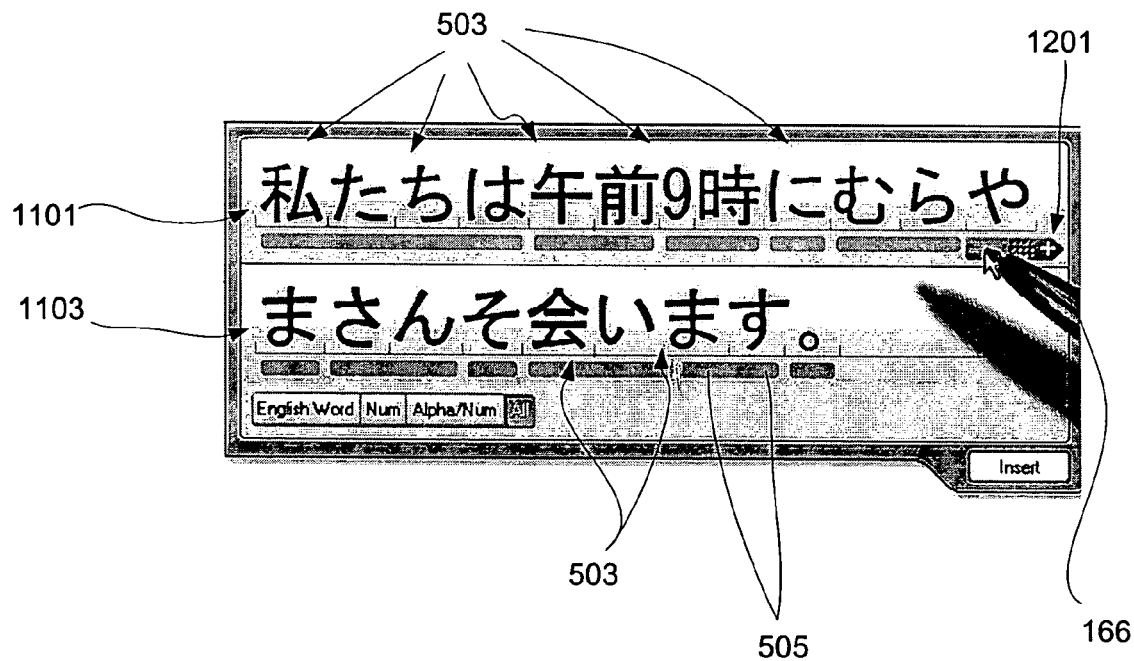

If a user wants to expand the last segmentation bar 505 in the first line 1101 to include a character 503 in the second line 1103, the user first selects the last segmentation bar 505 in the first line 1101 by, for example, moving a stylus 166 over the segmentation bar as shown in FIG. 12. In response, the last segmentation bar 505 changes appearance and displays a segmentation grip 801, as described in detail above. Because this segmentation bar 505 is the last segmentation bar 505 at the end of the line 1101 of text, it also displays a line extension grip 1201.

Figure 13:
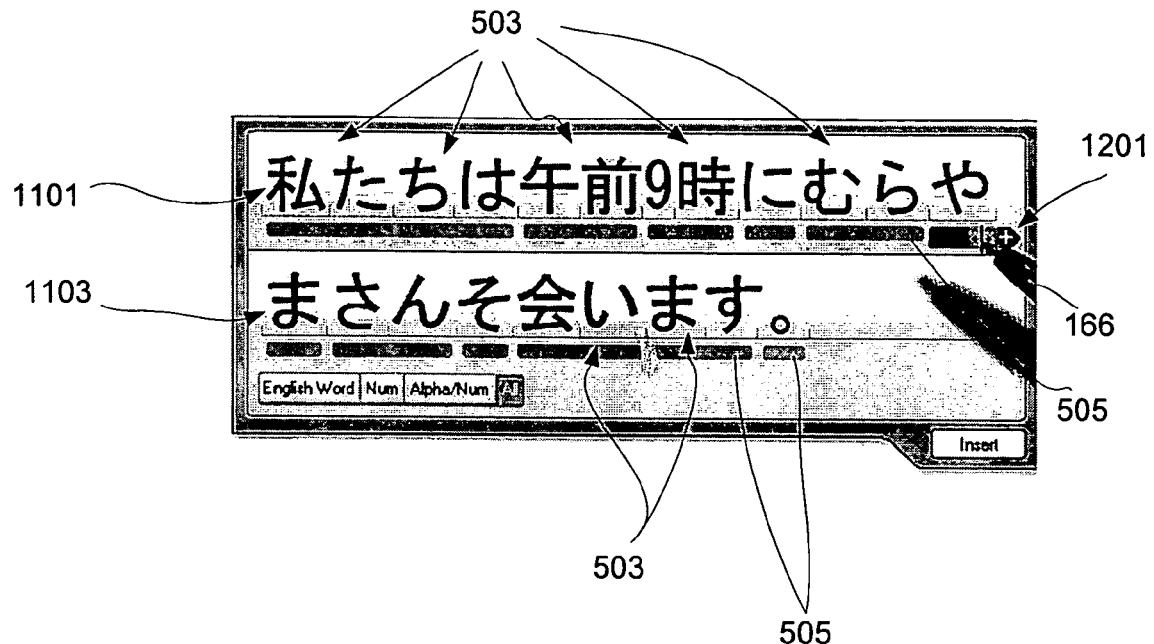

As the user moves the stylus 166 toward the line extension grip 1201 and it passes over the segmentation grip 801, the appearance of the pointer (i.e., the cursor) changes to indicate the function of the grip. More particularly, as shown in FIG. 13, the appearance of the pointer changes to a cursor with left and right arrows, to indicate to a user that the segmentation grip 801 can be moved left or right to reduce or expand the corresponding segment. If the user wishes to employ the segmentation grip 801, then the user may press the stylus 166 against the segmentation grip 801 and subsequently drag the segmentation grip 801 to reduce or expand the segmentation bar 505, as previously discussed. In the illustrated example, however, the selected segmentation bar 505 is the last segmentation bar 505 in the line 1101. Accordingly, with various examples of the invention, the user cannot expand the segmentation bar 505 to the next line 1101 using the segmentation grip 801.

Figure 14:
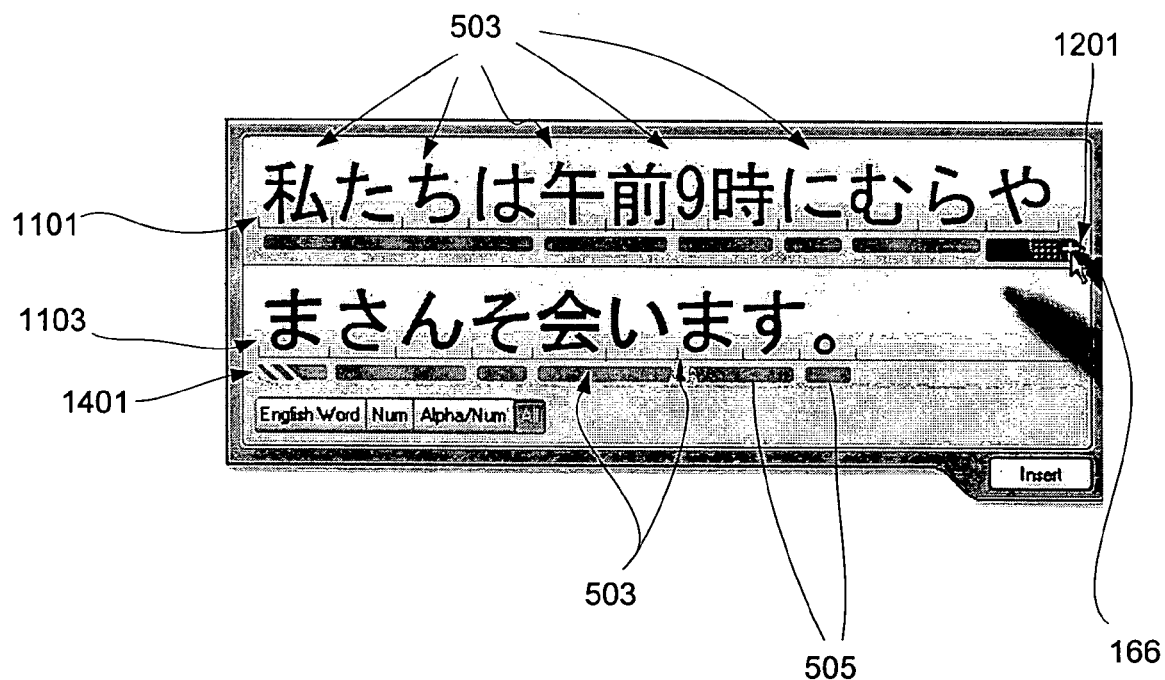
Figure 15:
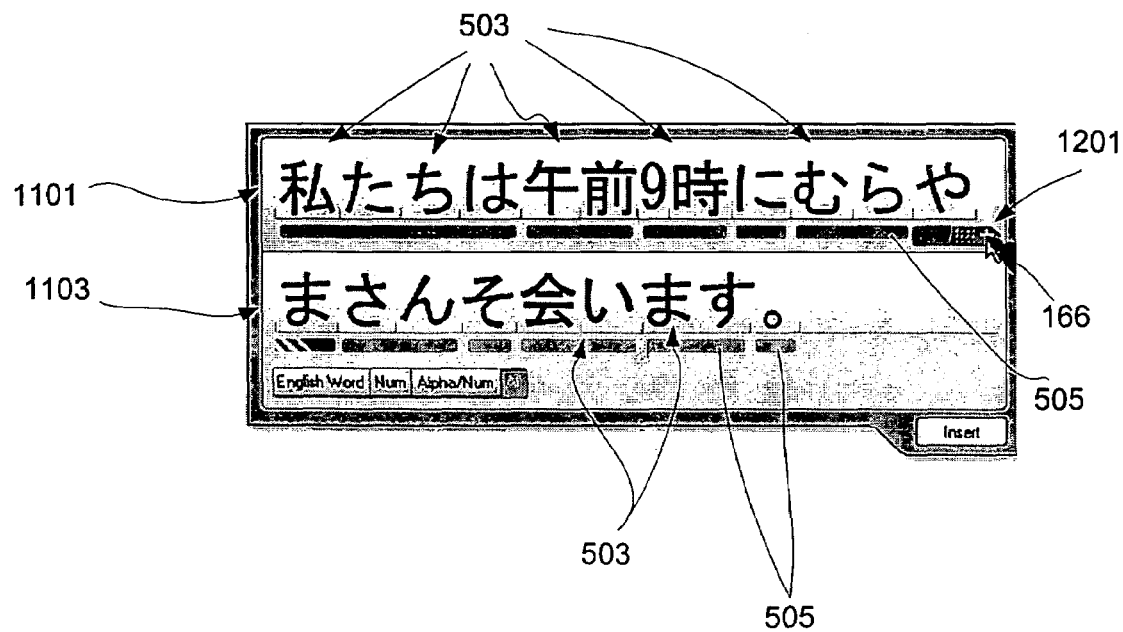

Instead, the user can move the stylus 166 further across the segmentation bar 505 to a position over the line extension grip 1201, as shown in FIG. 14. When the user positions the stylus 166 over the line extension grip 1201, the first segmentation bar 505 in the second line 1103 changes appearance as also shown in this figure. This change in appearance indicates to the user that the last segment in line 1101 can be expanded to include the first segment in line 1103. To execute the expansion of the segment identified by the last segmentation bar in the line 1101 to include the character 503 in the first segment of the line 1103, the user simply taps the line extension grip 1201 with the stylus 166 as illustrated in FIG. 15.

Figure 16:
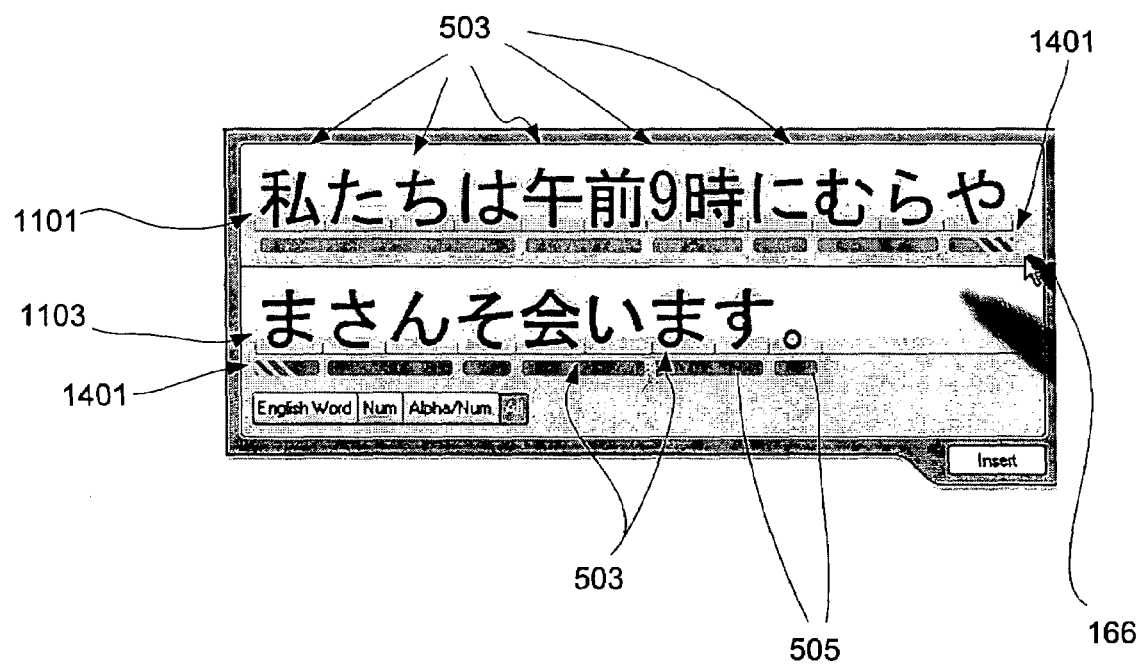

When the user removes the stylus 166, the appearance of both the last segmentation bar 505 in the line 1101 and the first segmentation bar 505 in the second line 1103 are changed, to indicate that these segmentation bars 505 have been combined to form a single segmentation bar 505 bridging the two lines 1101 and 1103, as illustrated in FIG. 16. Of course, different embodiments of the invention may employ one or more variations of the above-described techniques to expand a segmentation bar 505 over three or more lines of text.

CONCLUSION

While various examples of embodiments of then invention have been described above to provide an understanding of the invention, it should be appreciated that other embodiments of the invention may include additional or alternate features. For example, with the above-described embodiments of the invention, the character conversion functionality is automatically invoked by the data input panel. With alternate implementations, however, the character conversion functionality may be manually invoked. For example, the data input panel may include a control button to initiate the character conversion process. Alternately, the character conversion process may be manually invoked by making a gesture with a stylus or other pointing device.

To manually invoke the character conversion process, a user may, for example, use a pointing device to choose the target of the character conversion process and then activate an associated control button or make an associated gesture with a pointing device. The data input panel will then segment the targeted characters, and display the corresponding segmentation bars 505 (or other suitable indicator). Alternately, as shown in the above examples, the character conversion process can assume by default that all of the characters displayed on the input data panel are targets for the character conversion process, and accordingly segment all of the characters displayed by the data input panel.

It should also be appreciated that different embodiments of the invention may use a different indicator to identify segments other than the segmentation bar 505. For example, some embodiments of the invention may employ color changes or even borders other demarcation symbols to distinguish different segments. Also, with some embodiments of the invention, the segment indicator may only be used to identify a segment, with the user employing an alternate technique (such as commands on a menu) to initiate the conversion process and/or modify the identified segment.

Further, it should be appreciated that different techniques than using a segmentation grip 801 or a command from a menu may alternately or additionally employed to modify the segmentation of characters according to different embodiments of the invention. For example, some embodiments of the invention may expand or contract a segmentation bar 505 (or other segmentation indicator) to a position where the user activates a pointing device associated with a pointer (e.g., by tapping the stylus at the desired location). Alternately or additionally; the segmentation bar 505 (or other indicator) may be configured to automatically expand and/or contract upon the activation of an associated control in the data input panel.

From the foregoing description, it will be apparent that various embodiments of the invention can be employed to convert a group of Kana characters into a corresponding group of different characters, such as alternate Kana characters, Kanji characters, or a combination of Kana and Kanji characters. It should also be appreciated, however, that while the above-described examples related to the conversion of phonetic Hiragana characters to pictographic Kanji characters, various embodiments of the invention may be employed to translate any group of characters into an alternate corresponding group of characters.

For example, different embodiments of the invention may be used to convert or translate phonetic characters from, e.g., the English alphabet that describe a Korean word into a corresponding group of Korean and/or Chinese pictographic characters. Further, various examples of the invention may even be used to translate words in one language into corresponding words in another language. Advantageously, the various examples of the invention provide the functionality to perform any of these tasks within a text input interface such as the text input panel.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A computer-readable medium having stored thereon a computer program for converting characters of a first type into at least one character of a second type, said program when executed enables:

a user interface which:

displays a plurality of characters of the first type;

provides an indicator indicating which of the plurality of characters of the first type are to be associated together into a segment; and enables a user to manipulate the indicator to designate two or more of the displayed characters of the first type to be associated into the segment, a segmentation module that associates the characters into the segment based on the designation by the user via the user interface; and a character conversion module that converts the characters of the segment into at least one character of the second type.

2. The computer-readable medium recited in claim 1, wherein the indicator can be modified by the user to change which characters are associated together into the segment.

3. The computer-readable medium recited in claim 2, where the indicator appears as a bar running adjacent to characters associated together into the segment; and the user interface enables the user to manipulate the indicator to extend the bar to run adjacent to additional characters such that said additional characters are also associated in the segment.

4. The computer-readable medium recited in claim 2, wherein the indicator appears as a bar running adjacent to characters associated together into the segment; and the user interface enables the user to manipulate the indicator to contract the bar to not run adjacent to certain characters such that said certain characters are not associated in the segment.

5. The computer-readable medium recited in claim 1, wherein the user interface provides at least one menu command selectable by the user that indicates a potential designation of one or more characters to be associated in the segment, wherein the potential designation is determined based on a current user designation of the characters associated in the segment by the segmentation module.

6. The computer-readable medium recited in claim 1, wherein the user interface displays a second indicator indicating which of the plurality of characters of the first type are to be associated together into a second segment.

7. The computer-readable medium recited in claim 1, wherein the user interface displays a plurality of characters of a first type on two or more lines; and wherein the indicator can be modified by a user to indicate which of the characters on different lines are to be associated together into the segment.

8. The computer-readable medium recited in claim 1, further comprising an electronic ink recognition module for recognizing at least one of the characters of the first type from electronic ink.

9. The computer-readable medium recited in claim 1, wherein the first type of character is a phonetic type and the second type of character is a pictographic type.

10. The computer-readable medium recited in claim 1, wherein the first type of character is Kana and the second type of character is Kanji.

11. The computer-readable medium recited in claim 1, wherein the user interface displays a menu comprising a list of conversion alternatives determined based on the segment; and enables the user to select one of said conversion alternatives, wherein the character conversion module converts the characters of the segment to the conversion alternative selected by the user.

12. A method of associating and converting two or more characters of a first type into at least one character of a second type, comprising:

receiving a plurality of characters;

displaying the plurality of characters in a user interface;

providing, in the user interface, an indicator capable of being manipulated by the user to indicate a first group of the plurality of characters to be associated into a segment;

receiving input from a user modifying the indicator to indicate a second group of the plurality of characters into the segment; and converting the characters of the segment into at least one character of the second type.

13. The method recited in claim 12, wherein the second group includes the first group and additional characters.

14. The method recited in claim 12, wherein the second group includes only a portion of the first group of characters.

15. The method recited in claim 12, wherein the indicator is a bar adjacent to the first group of characters; and the input changes a length or position of the bar so that the bar is adjacent to the second group of characters.

16. The method recited in claim 12, further including displaying the first group of characters on a first line of characters;

displaying a first portion of the second group of characters on the first line;

displaying a second portion of the second group of characters on a second line of characters; and receiving input that modifies the indicator to extend from the first line to the second line.

17. The method recited in claim 12, further comprising displaying a menu comprising a list of conversion alternatives determined based on the segment; and receiving user input of one of the conversion alternatives, converting the characters of the segment to the conversion alternative inputted by the user.

18. The method recited in claim 12, wherein the plurality of characters are received from an electronic ink recognition module for recognizing at least one of the characters of the first type from electronic ink.

* * * * *